United States Patent [19]

Hanazono et al.

[11] Patent Number: 4,685,014

[45] Date of Patent: Aug. 4, 1987

[54] PRODUCTION METHOD OF THIN FILM MAGNETIC HEAD

[75] Inventors: Masanobu Hanazono; Shinichi Hara; Hirosi Akiyama, all of Hitachi; Masaaki Hayashi; Harunobu Saitoo, both of Odawara; Takumi Kurisu, Hamada, all of Japan

[73] Assignee: Computer Basic Technology Association, Tokyo, Japan

[21] Appl. No.: 403,015

[22] Filed: Jul. 29, 1982

[30] Foreign Application Priority Data

Aug. 14, 1981 [JP] Japan .................... 56-126698

[51] Int. Cl.$^4$ .................................. G11B 5/147
[52] U.S. Cl. .................................. 360/126; 29/603; 156/643; 156/668
[58] Field of Search ............... 29/603; 360/125, 126, 360/127; 156/643, 657, 659.1, 668

[56] References Cited

U.S. PATENT DOCUMENTS

| | | | |
|---|---|---|---|
| 4,025,411 | 5/1977 | Hom-ma et al. | 156/643 X |
| 4,052,749 | 10/1977 | Nomura et al. | 310/239 |
| 4,242,710 | 12/1980 | Hempstead et al. | 360/126 X |
| 4,281,357 | 7/1981 | Lee | 360/125 |
| 4,295,173 | 10/1981 | Romankiw et al. | 360/125 |
| 4,429,337 | 1/1984 | De Wilde | 360/125 |

FOREIGN PATENT DOCUMENTS

| | | | |
|---|---|---|---|
| 0135321 | 10/1980 | Japan | 29/603 |
| 0058124 | 5/1981 | Japan | 29/603 |

OTHER PUBLICATIONS

IBM Disk Storage Tech., D. Thompson et al, "Film Head Development", Feb. 1980, pp. 3-4.

Primary Examiner—John H. Wolff
Assistant Examiner—David J. Severin
Attorney, Agent, or Firm—Antonelli, Terry & Wands

[57] ABSTRACT

In producing a magnetic head by thin film technique, a magnetic film is formed on an insulating member covering coil conductor films after the surface of the insulating member is flattened. After a flattening coating is formed on the insulating member, the flattening coating as well as the insulating member are etched by plasma-assisted etching technique in order to flatten the surface.

25 Claims, 21 Drawing Figures

PRODUCTION METHOD OF THIN FILM MAGNETIC HEAD

BACKGROUND OF THE INVENTION

This invention relates to a production method of a thin film magnetic head for use in a magnetic drum, magnetic tape or magnetic disc of a magnetic recording equipment.

The thin film magnetic head is a magnetic head which is produced by thin film technique in order to enhance the magnetic recording density of the magnetic drum, magnetic tape or magnetic disc. Generally, the head has a laminate structure in which lower and upper magnetic films for forming a magnetic circuit having a magnetic gap and coil conductor films passing between both magnetic films and crossing the magnetic circuit are laminated at necessary portions of a substrate via an insulating member. At times, a part or the entire portion of the substrate is made of a magnetic substance and serves as the lower magnetic film depending upon the intended application.

The major problems with the thin film magnetic head that are yet to be solved are (1) reduction of the size of the device and improvement of magnetic characteristics such as reduction of writing power and improvement of reading sensitivity and (2) provision of a high precision structure which is easy to produce.

As one of the methods of solving these problems, a method is known in which a photosensitive resin is used as the insulating member between the lower and upper magnetic films. This method is described on page 4 of "IBM Disk Storage Technology", February, 1980, for example. According to this method, the recesses (gaps) defined between the windings of the coil conductor films are filled with the resin so that the upper surface of the insulating member at the winding portions of the coil conductor films are flattened and hence, the surface of the upper magnetic film to be formed thereon is also flattened. As a result, permeability can be drastically improved when compared with the surface having concavo-convexities thereon. In accordance with this method, too, the pattern accuracy of the insulating member can be improved in comparison with the case in which an insulating member other than the photosensitive resin is to be etched, because the etching mask is not necessary.

In spite of these advantages, the insulating member consisting of the photosensitive resin is not free from the drawback in that since its heat resistance is low, the upper magnetic film to be formed thereon must be formed by such a method that hardly involves the temperature rise. The following problems would occur if such a method is used in order to form the magnetic film.

Plating can be cited as one of the methods that hardly involve the temperature rise. However, the film composition is caused to drastically change even by a slight change of the condition and consequently, the film having desired magnetic characteristics can not be obtained easily with good reproducibility. In addition, control of the film thickness distribution is difficult and a uniform film thickness can not be obtained. Moreover, an apparatus for treating the waste liquor is necessary.

Another method of forming the film that does not involve the temperature rise is vacuum evaporation or sputtering. However, when a several micron-thick film necessary as the upper magnetic film is formed by these methods while keeping the substrate at such a temperature that does not adversely affect the insulating member, the resulting magnetic film has perpendicular magnetic anisotropy having the easy axis of magnetization in the direction of film thickness because of the internal stress and the permeability becomes as low as up to 300. If the thin film magnetic head is formed by use of the magnetic film having such low permeability, the drop of reading sensitivity and recording density would occur and the advantages of the thin film magnetic film can not be used fully.

SUMMARY OF THE INVENTION

It is an object of the present invention to provide a production method of a thin film magnetic head which eliminates the abovementioned problems with the prior art.

It is another object of the present invention to provide a production method of a thin film magnetic head whose lower and upper magnetic films have high permeability.

It is still another object of the present invention to provide a production method of a thin film magnetic head which makes use of materials other than a photosensitive resin as the insulating member between the lower magnetic film and the upper magnetic film and in which the portions of the upper magnetic film corresponding to the windings of coil conductor films are flattened.

To accomplish these objects, the production method of a thin film magnetic head in accordance with the present invention is characterized in that a material having higher heat-resistance than a photosensitive resin is used as the insulating member to be interposed between the lower magnetic film from the upper magnetic film so as to electrically insulate coil conductor films from one another and the lower and upper magnetic films from the coil conductor films, and the upper magnetic film is formed after the surface of the insulating member is subjected to flattening treatment. Examples of the materials that can be used as the insulating member in the present invention include organic materials such as polyimide type resins and maleimide type resins, inorganic materials such as $SiO_2$, $Al_2O_3$, $Si_3N_4$, $SiO_2$—$B_2O_3$ type glass (boro-silicate glass) and phospho-silicate glass, and their mixtures. These materials have higher heat resistance than the photosensitive resin. More definitely, since they are thermally stable at a temperature of 300° C. or above, the upper magnetic film can be formed at a higher temperature and a magnetic film having higher permeability can be obtained. Though these materials provide such an advantage over the photosensitive resin, they have the drawback in that the surface can not be flattened by the mere heating treatment as used for the photosensitive resin. The present invention solves this problem in the following manner.

First, a flattening coating is formed on the non-uniform surface of the insulating member having the concavo-convex surface in such a thickness that the surface of the coating can be later flattened. Next, the surface of the flattening coating is etched by plasma-assisted etching technique, thereby making it possible to have the surface of the insulating member flat. Preferably, the flattening coating has fluidity at normal temperature and suitable materials are those whose fluidity increases upon heating. It is possible to use, for example, positive and negative type photoresists, tetrafluoroethylene, novolak resins, and so forth. The plasma-assisted etching technique includes ion milling, sputter etching, plasma etching and the like. As the flattening coating in the flattening treatment, it is possible to use the same or different material from the insulating member. When the same material is used, it is difficult to represent the interface between the insulating member and the flattening coating. However, it can be understood that the flattening coating is formed on the insulating member so long as the insulating member has a thickness greater than necessary for the electric insulation of the coil conductor films from the upper magnetic film and its surface can be flattened. Though workability is high in this case, control of the film thickness is somewhat difficult. When the flattening coating of the material different from the material of the insulating member is formed on the insulating member, it is of importance that the etching rate of both materials with respect to the plasma-assisted etching technique is substantially equal. This is because the convex portions on the surface of the insulating member must be etched in order to have the surface of the insulating member flat and in carrying out this etching, both insulating member and flattening coating are simultaneously etched. Hence, the etched surface can not be made flat unless the etching rate of them is substantially equal. A preferred range of the etching condition satisfying this requirement is illustrated below.

TABLE

| Etching Method | Etching Conditions Operating Conditions | |
| --- | --- | --- |
| Ion Milling | Accelerating Voltage | 400~800 V |
| | Pressure | $10^{-4} \sim 10^{-6}$ Torr |
| | Ion Beam Angle | 0~45° |
| | Atmosphere | $O_2$, Ar.Ar + $O_2$, etc. |
| Sputter Etching | Sputtering Voltage | 500~2000 V |
| | Pressure | $10^{-2} \sim 10^{-3}$ Torr |
| | RF Power Density | 10~100 kW/m$^2$ |
| | Atmosphere | $O_2$, Ar, Ar + $O_2$, etc. |
| Plasma Etching | Etching Power | 5~500 kW/m$^2$ |
| | Pressure | $1 \sim 10^{-2}$ Torr |
| | Etching Gas | $CF_4$, $CF_4 + O_2$ etc. |

DESCRIPTION OF THE PREFERRED EMBODIMENTS

FIG. 1 illustrates step-wise the production method of the thin film magnetic head in accordance with an embodiment of the present invention. Hereinafter, the production method of the thin film magnetic head will be described with reference to the drawing.

Figure 1A:
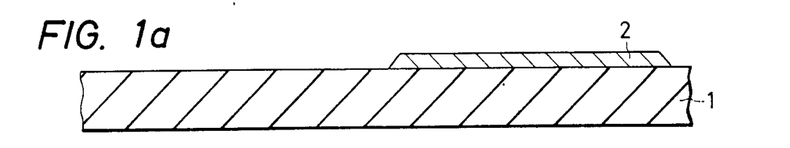
FIGS. 1a through 1i illustrate step-wise the production method of the thin film magnetic head in accordance with one embodiment of the present invention.

First, a substrate 1 made of a non-magnetic material is prepared, as shown in FIG. 1a, and a lower magnetic film 2 is formed at a selected portion on one of the surfaces of the substrate. An $Al_2O_3$—TiC plate and permalloy are used as the substrate 1 and the lower magnetic film 2, for example, respectively. Though various methods of forming selectively the lower magnetic film 2 are available, this embodiment employs the method which forms the permalloy film over the entire surface of one of the surfaces of the substrate by sputtering and removes then the unnecessary portions by the known photoetching technique.

Figure 1B:
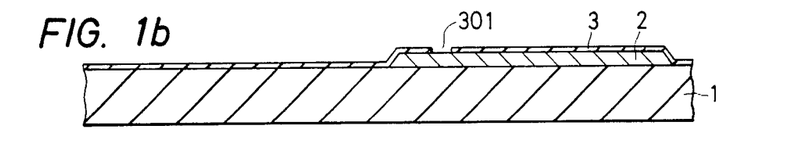

FIG. 1b illustrates the step in which an inorganic insulating layer 3 is formed on one of the surfaces of the substrate 1 and on the lower magnetic film 2. A part of this inorganic insulating layer 3 on the lower magnetic film 2 is shaped as a window 301 so as to expose the lower magnetic film 2. The inorganic insulating layer 3 consists of $Al_2O_3$, for example, and is formed by sputtering.

Figure 1C:
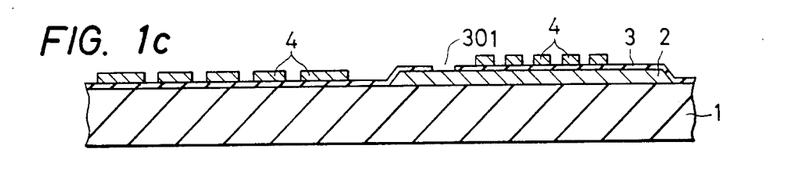

FIG. 1c illustrates the step in which a coil conductor film 4 having a predetermined number of winding is formed on the inorganic insulating layer 3. The portions of the coil conductor film 4, which are positioned on the lower magnetic film 2, have a reduced width as compared with the width of the other portions. A material having high electric conductivity such as copper is used as the coil conductor film, which is formed by plating, vacuum evaporation, sputtering or the like.

Figure 1D:
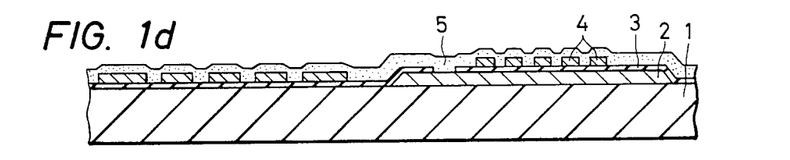

FIG. 1d illustrates the step in which an insulating member 5 is disposed between the coil conductor films 4 and between the coil conductor films and an upper magnetic film at those portions where the upper magnetic film is disposed in order to establish electric insulation between them. A polyimide-iso-indroquinazolinedione resin is used as the insulating member 5 in this embodiment. The surface of the insulating member 5 is concavo-convex in match with the pattern of the coil conductor films 4.

Figure 1E:
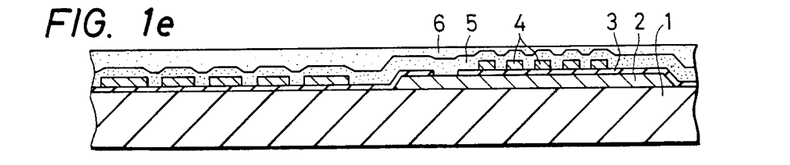

FIG. 1e illustrates the step in which a flattening coating 6 is formed on the insulating member 5. It is sufficient if the flattening coating 6 is formed on the surface to be flattened, that is, on the surface of the insulating member 5 on which the upper magnetic film is to be formed. However, the coating 6 is shown disposed over the entire surface of the insulating member 5 in the drawing in order to make easy the formation of the flattening coating 6 and the later-appearing flattening treatment. A positive type photoresist, e.g., AZ-1350 (tradename of Shipley Company), is used as the material of the flattening coating 6. This photoresist has considerable fluidity at normal temperature but when heated, it shows increasing fluidity. Hence, this is best suited as the material of the flattening coating.

Figure 1F:
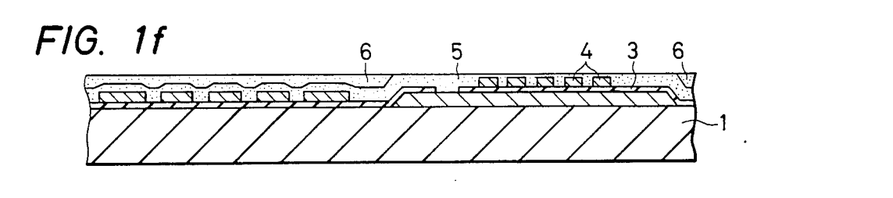

FIG. 1f illustrates the step in which predetermined portions of the flattening coating 6 and insulating member 5 are cut off away from the flattening coating 6 by the plasma-assisted etching technique. Ion milling method using argon ion is used as the plasma-assisted etching technique under the condition of the acceleration voltage of Ar ion of 700 V, the ion incident angle (angle between the line perpendicular to the work surface and the ion stream) of 30°, the vacuum of $5 \times 10^{-4}$ Torr, the current density of 1.0 mA/cm$^2$ and the substrate temperature of approximately 50° C. Under this condition, as cutting proceeds, both flattening film 6 and insulating member 5 are exposed to the work surface and in this case, the cutting speed of both of them, that is, their etching rate, can be made substantially equal to each other. The abovementioned condition is obtained by the following experimental examination.

Figure 3:
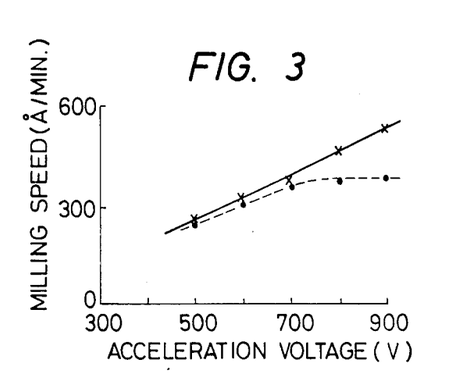
FIG. 3 is a diagram illustrating the relation between the ion acceleration voltage and the milling speed in the ion milling method.

FIG. 3 illustrates the relation between the milling speed of the polyimide-iso-indroquinazoline-dione resin (represented by solid line) as the insulating member and the photoresist (represented by broken line) as the flattening coating and the acceleration voltage of the argon ion. The ion incident angle $\theta$ is 30° C. It can be seen from the diagram that the solid line describes substantially the same curve as the broken line when the acceleration voltage is up to about 700 V. In other words, it can be understood that the cutting speed is the same at the same acceleration voltage.

Figure 4:
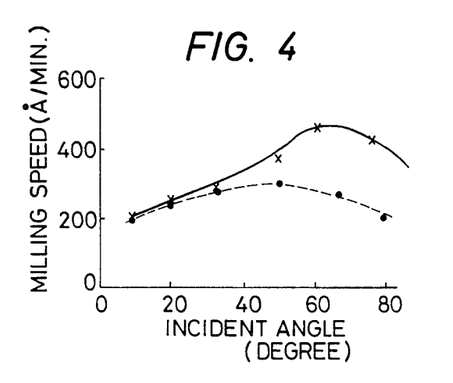
FIG. 4 is a diagram illustrating the relation between the ion incident angle and the milling speed in the ion milling method.

FIG. 4 illustrates the relation between the milling speed and the incident angle when the argon ion of the acceleration voltage of 700 V is radiated on the work surface for the same testpiece as used in FIG. 3. It can be seen from the diagram that the solid line is substantially the same as the broken line when the incident angle of up to about 30°. Accordingly, the different material surfaces can be milled at a substantially equal milling speed by selecting the suitable milling condition.

In this step of FIG. 1f, milling is effected until all the portions of the insulating member 5, on which the upper magnetic film is to be formed, are exposed on the work surface, and is terminated when they are exposed. The end of milling is determined by controlling the ion radiation time on the basis of the predetermined milling speed. After this step is completed, the surface of the insulating member 5, on which the upper magnetic film is to be formed, is flattened. The flattening coating 6 is left unremoved on the other portions of the surface of the insulating member 5.

Figure 1G:
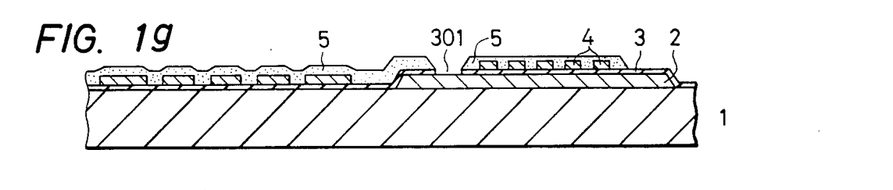

FIG. 1g illustrates the step in which the flattening coating 6 left at the time of completion of the step of FIG. 1f is removed and at the same time, the portions corresponding to the window 301 of the insulating member 5 and the magnetic gap G are selectively removed. Acetone or an alkaline resist removing agent is used for removing the flattening coating 6 while a hydrazine type aqueous solution is used for removing the insulating member 5.

Figure 1H:
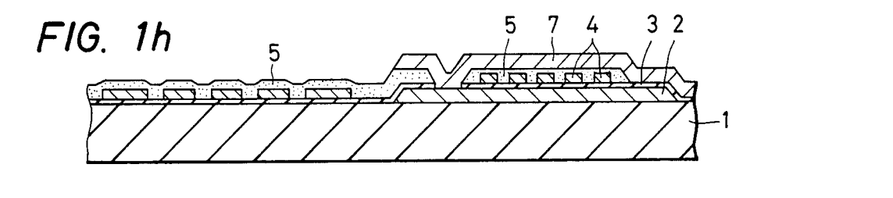

FIG. 1h illustrates the step in which the upper magnetic film 7 is formed on the flattened surface of the insulating member 5 and on the surface of the portions where the insulating member 5 is removed in the step of FIG. 1g. Permalloy is used as the magnetic film and sputtering is used for forming the film. The upper magnetic film 7 may be formed on the desired portions either by selective sputtering or by forming the film on the entire surface and then selectively etching and removing the unnecessary portions.

Figure 1I:
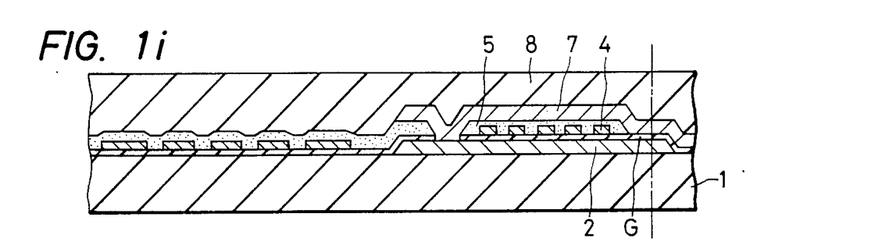

FIG. 1i illustrates the step in which a protective member 8 is formed on the upper magnetic film 7, the insulating member 5 and the exposed substrate 1. The protective member 8 is made of $Al_2O_3$, for example, and is formed by sputtering.

Figure 2:
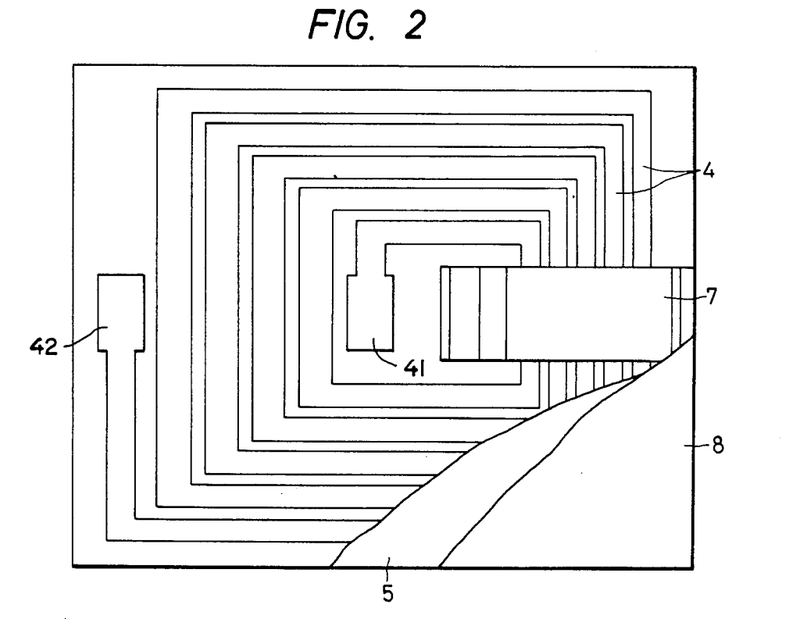
FIG. 2 is a plan view of the thin film magnetic head produced by the production method illustrated in FIG. 1.

After the step of FIG. 1i is completed, the laminate consisting of the substrate 1, the lower magnetic film 2, the inorganic insulating layer 3, the upper magnetic film 7 and the protective member 8 is cut off, completing the thin film magnetic head. FIG. 2 is a plan view of the thin film magnetic head thus completed and principally illustrates the pattern of the coil conductor film 4. Reference numerals 41 and 42 represent terminals disposed at both ends of the coil conductor film 4. Solder pads are formed on the terminal by C.C.B. (controlled collapse bonding) process, for example. Though the pattern of the coil conductor film 4 shown in the drawing consists of the combination of linear portions, the corners may be round and each winding may also be round.

In accordance with the production method of the thin film magnetic head described above, the upper magnetic film 7 can be formed at high temperature and a magnetic film having high permeability can be obtained because the insulating member 5 to form the upper magnetic film can be made of a heat-resistant material. The conventional problem encountered when the insulating member is made of a heat-resistant material, that is to say, the problem that the surface of the insulating member is affected by the pattern of the coil conductor film and becomes concavo-convex thereby to reduce the permeability of the upper magnetic film, can be solved in the present invention by milling the portions of the insulating member 5, on which the upper magnetic film is to be formed, by plasma-assisted etching technique by use of the flattening coating 6 before the formation of the upper magnetic film 7. In this aspect, too, the upper magnetic film having high permeability can be obtained. An example of the device will be explained more definitely by use of numerical values.

A polyimide-iso-indroquinazolinedione resin is coated in a thickness of about 3 $\mu$m on a coil conductor film having a thickness of 1.5 $\mu$m, a width of 6 $\mu$m and a gap of 3 $\mu$m and is then baked in a vacuum to provide an insulating member. The surface of the insulating member becomes concavo-convex in a height of 0.8 $\mu$m. Permalloy (78-84% Ni-Fe) is spattered in a thickness of about 4 $\mu$m on this insulating member to form an upper magnetic film. The film has permeability of 3,000. When the surface of the insulating member is subjected to the flattening treatment in accordance with the present invention, on the other hand, the concavo-convex surface is turned into a flat surface having a height of up to 0.1 $\mu$m and the upper magnetic film formed thereon has permeability of 6,000. The flattening treatment is carried out by applying a photoresist, AD-1350J, in a thickness of about 2 $\mu$m on the insulating member, then heating the insulating member at 160° C. and cutting a part each of the resist film and the insulating member by the ion milling method using the argon ion. The ion milling condition is the same as that described with reference to FIG. 1f.

Figure 5:
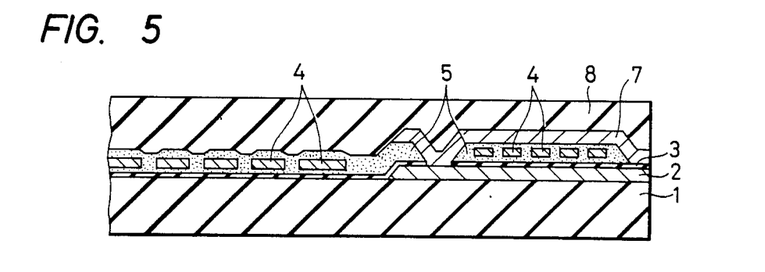
FIGS. 5 and 6 are sectional views, each showing a modified embodiment of the embodiment illustrated in FIG. 1.
Figure 6:
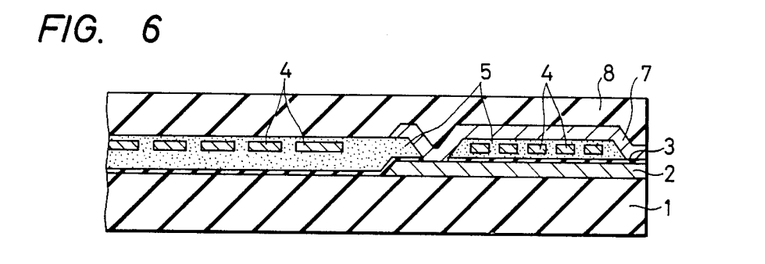

The embodiment illustrated in FIGS. 1a through 1i can be modified as illustrated in FIGS. 5 and 6.

FIG. 5 illustrates a structure in which a part of the insulating member 5 is interposed between the inorganic insulating layer 3 and the coil conductor film 4. This structure can be obtained by forming a thin layer on the inorganic insulating layer 3 prior to the step of FIG. 1c by use of the same material as that of the insulating member 5. It is necessary that the inorganic insulating layer 3 be as thin as possible in order to improve the recording density because the layer 3 determines the magnetic gap G. If the inorganic insulating layer is made thinner, however, the insulating property would decrease due to pin-holes. The structure shown in FIG. 5 solves all these problems.

FIG. 6 illustrates a structure as a further improvement to the structure of FIG. 5. In this structure, the coil conductive films 4 are all disposed at an equal distance from the surface of the substrate so as to facilitate the production of the coil conductive films.

FIG. 7 illustrates step-wise the production method of the thin film magnetic film in accordance with another embodiment of the present invention. The steps corresponding to FIGS. 1a through 1g are deleted because they are substantially the same in this embodiment, too. The difference of this embodiment in the steps of FIGS. 1a through 1g is that the insulating member 5 shown in FIG. 1g is not selectively removed but is left as such. Hereinafter, the production method will be explained with reference to the drawing.

Figure 7A:
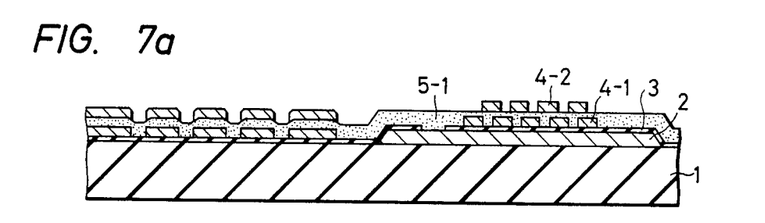
FIGS. 7a through 7g illustrate step-wise the production method in accordance with another embodiment of the present invention.

FIG. 7a illustrates the step in which a second coil conductor film 4-2 is formed on a first insulating member 5-1. This is the same as the step of FIG. 1c in which the first coil conductor film 4-1 is formed.

Figure 7B:
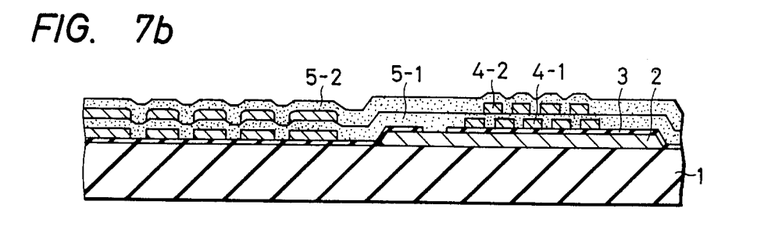

FIG. 7b illustrates the step in which a second insulating member 5-2 is formed on the second coil conductor film 4-2 and on the first insulating member 5-1. This step is carried out in the same way as the step of FIG. 1d.

Figure 7C:
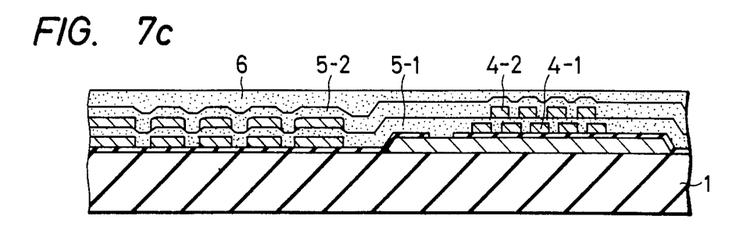

FIG. 7c illustrates the step in which a flattening coating 6 is formed on the second insulating member 5-2. This step is the same as the step shown in FIG. 1e.

Figure 7D:
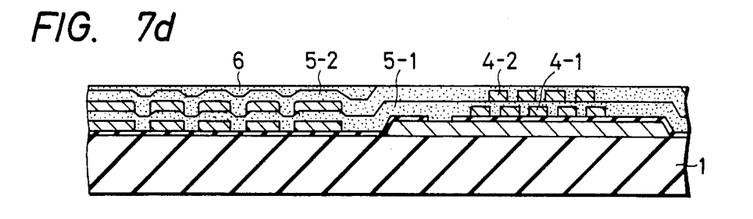

FIG. 7d illustrates the step in which the flattening coating 6 is cut from its surface to the predetermined portions of the coating 6 and second insulating member 5-2 by plasma-assisted etching technique so as to flatten the portions of the second insulating member 5-2 on which the upper magnetic film is to be formed. The detail of this step is the same as that of FIG. 1f.

Figure 7E:
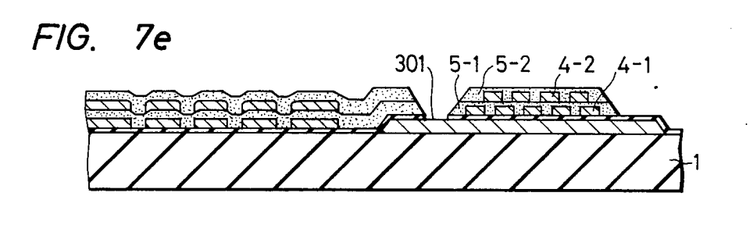

FIG. 7e illustrates the step in which the flattening coating 6 is removed and the portions of the first and second insulating members 5-1 and 5-2 corresponding to the window 301 and to the magnetic gap G are selectively removed. The removing method is the same as that of FIG. 1g.

Figure 7F:
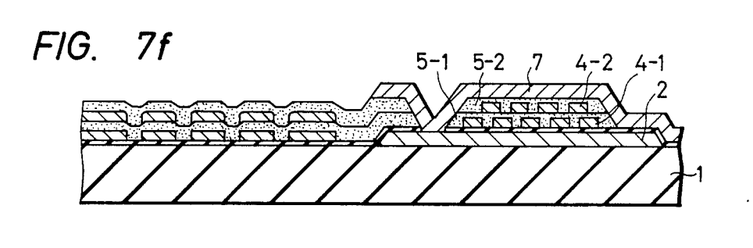

FIG. 7f illustrates the step in which the upper magnetic film 7 being formed utilizing the same process shown in FIG. 1h.

Figure 7G:
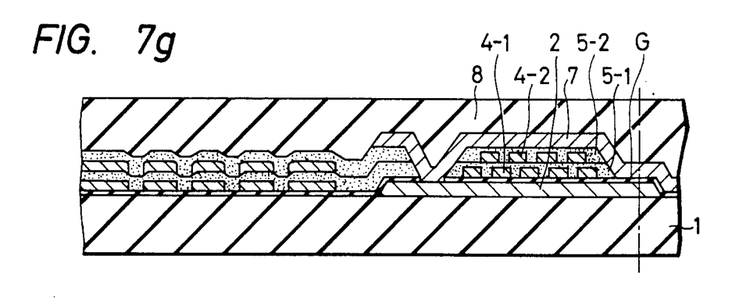

FIG. 7g illustrates the step in which a protective member 8 is formed.

After the step of FIG. 7g is completed, the laminate is cut along the dot-and-chain line, completing a thin film mangetic head having the two-layered coil conductor film.

If the coil conductor film has the two-layered structure as in this embodiment, the concavo-convexity of the surface of the second insulating member 5-2 becomes about twice that of the single-layered structure shown in FIG. 1 and the drop of permeability becomes remarkable. However, the present invention can eliminate the drop of permeability by subjecting the surface each of the first and second insulating members after they are formed as illustrated in this embodiment.

This embodiment can also be modified as illustrated in FIGS. 5 and 6.

What is claimed is:

1. A production method of a thin film magnetic head, said thin film magnetic head including:
   a lower magnetic film;
   an upper magnetic film having one end thereof coming into contact with one end of said lower magnetic film and having an end opposite to said one end facing a corresponding end of said lower magnetic film via a magnetic gap, thereby forming a magnetic circuit having a magnetic gap at a part thereof in cooperation with said lower magnetic film;
   coil conductor films having part thereof passing between said upper and lower magnetic films and crossing said magnetic circuit, and having a predetermined number of windings; and
   an insulating member made of an organic material electrically insulating said coil conductor films from one another and said coil conductor films from at least said upper magnetic film;
   said upper and lower magnetic films, said coil conductor films and said insulating member being formed in lamination by thin film technique;
   said method characterized in that a flattening coating made of a further organic material, having a surface, is formed on a portion of said insulating member at which said upper magnetic film is to be formed, wherein said portion of said insulating member at which the upper magnetic film is to be formed has a concavo-convex surface before etching of said portion, the flattening coating being formed, before the formation of said upper magnetic film, in such a thickness that the surface of said flattening coating can be flattened; and then etching is performed to etch said flattening coating and parts of said insulating member so as to expose the entire portion of said insulating member on which said upper magnetic film is to be formed such that the surface of said portion is flattened, the portion, ranging from the surface of said flattening coating to said insulating member, being etched and changed into a substantially flat surface having a height up to 0.1 μm by plasma-assisted etching technique under such a condition where the etching speed of said flattening coating is substantially equal to that of said insulating member.

2. The production method of a thin film magnetic head as defined in claim 1 wherein said flattening coating consists of a material selected from the group consisting of positive and negative type photoresists, tetrafluoroethylene, and novolak type resins.

3. The production method of a thin film magnetic head as defined in claim 1 wherein ion milling, sputter etching or plasma etching is used as said plasma-assisted etching technique.

4. Product formed by the process of claim 1.

5. A method as defined in claim 1, including adjusting the etching conditions such that the etching speed of the flattening coating is substantially equal to that of said insulating member.

6. A method as defined in claim 1, wherein said organic material and said further organic material are different materials.

7. A method as defined in claim 1 wherein said insulating member is made of polyimide-iso-indroquinazolinedione resin.

8. Product formed by the process of claim 7.

9. The production method of a thin film magnetic head as defined in claim 1 wherein said insulating member is an electrically insulating member heat-resistant to a temperature of 300° C. or above.

10. The production method of a thin film magnetic head as defined in claim 9 wherein said insulating member is a material selected from the group consisting of a polyimide type resin and a maleimide type resin.

11. A method as defined in claim 10 wherein said insulating member is made of polyimide-iso-indroquinazolinedione resin.

12. Product formed by the process of claim 11.

13. A method of forming a thin film magnetic head, comprising:

forming a lower magnetic film on a substrate;

forming coil conductor films on said lower magnetic film, said coil conductor films being insulated from said lower magnetic film, said coil conductor films having a predetermined number of windings;

forming an insulating member made of an organic material electrically insulating said coil conductor films from one another and for electrically insulating said coil conductor films from an upper magnetic film to be formed on top of said coil conductor films, said insulating member having a non-uniform surface, wherein a portion of the insulating member on which said upper magnetic film is to be formed has a concavo-convex surface;

forming a flattening coating made of a further organic material at least on the portion of said insulating member, having the concavo-convex surface, on which said upper magnetic film is to be formed, said flattening coating having a surface opposed to the surface adjacent said insulating member, said flattening coating having a thickness sufficient such that the opposed surface can be flattened;

etching said flattening coating down to said insulating member so as to expose the entire portion of the insulating member on which said upper magnetic film is to be formed, to flatten the surface on which said upper magnetic film is to be formed such that the flattened surface has a height of up to 0.1 µm, said etching being performed by a plasma-assisted etching technique under such a condition where the etching speed of said flattening coating is substantially equal to that of said insulating member; and forming said upper magnetic film on the flattened surface, said upper magnetic film being formed to have one end coming into contact with one end of said lower magnetic film, and to have an end opposite to said one end facing a corresponding end of said lower magnetic film via a magnetic gap, to thereby form a magnetic circuit having a magnetic gap at a part of the upper magnetic film in cooperation with said lower magnetic film.

14. The method as defined in claim 13 wherein said insulating member is made of a material having higher heat resistance than photosensitive resins.

15. The method as defined in claim 13 wherein said insulating member is made of a material that is thermally stable at temperatures of at least 300° C.

16. The method as defined in claim 13 wherein said flattening coating is made of a material selected from the group consisting of photoresist, polytetrafluoroethylene, and novolak type resins.

17. The method as defined in claim 13 wherein, after said etching to form the flattened surface but before said forming said upper magnetic film, the steps of forming said coil conductor films, forming said insulating member, forming said flattening coating, and etching said flattening coating are repeated, to thereby form plural layers of coil conductor films prior to forming the upper magnetic film.

18. A method as defined in claim 13, including adjusting the etching conditions such that the etching speed of the flattening coating is substantially equal to that of said insulating member.

19. A method as defined in claim 13, wherein said organic material and said further organic material are different materials.

20. A method as defined in claim 13 wherein said insulating member is made of polyimide-isoindroquinazolinedione resin.

21. Product formed by the process of claim 20.

22. The method as defined in claim 13, wherein said insulating member is made of a material selected from the group consisting of polyimide type resins and maleimide type resins.

23. The method as defined in claim 22 wherein said flattening coating is made of a material selected from the group consisting of photoresist, polytetrafluoroethylene, and novolak type resins.

24. A method as defined in claim 22 wherein said insulating member is made of polyimide-isoindroquinazolinedione resin.

25. Product formed by the process of claim 24.

* * * * *